June 20, 1933.   R. P. HEUER   1,914,716
COPPER MELTING FURNACE
Filed April 23, 1930   3 Sheets-Sheet 1

Witnesses:

Inventor
Russell P. Heuer,
By
Attorney.

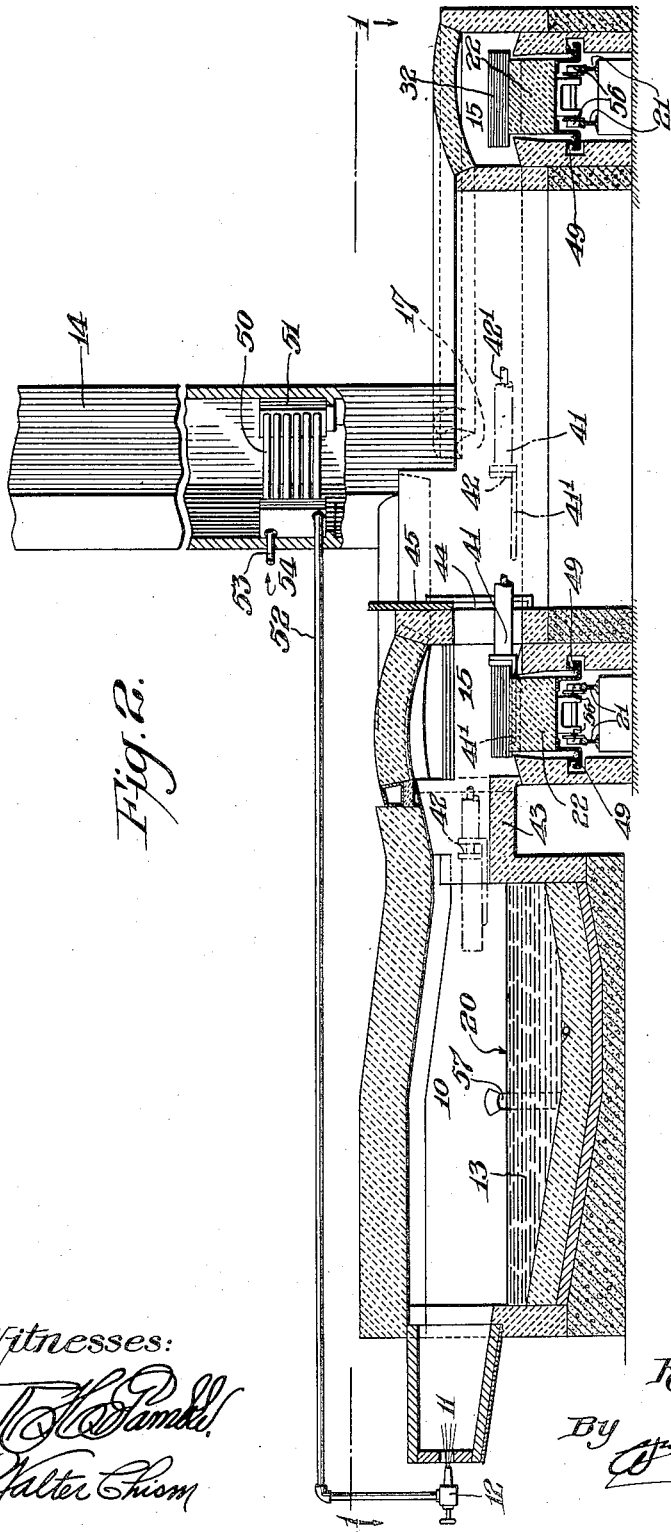

June 20, 1933.  R. P. HEUER  1,914,716
COPPER MELTING FURNACE
Filed April 23, 1930   3 Sheets-Sheet 3
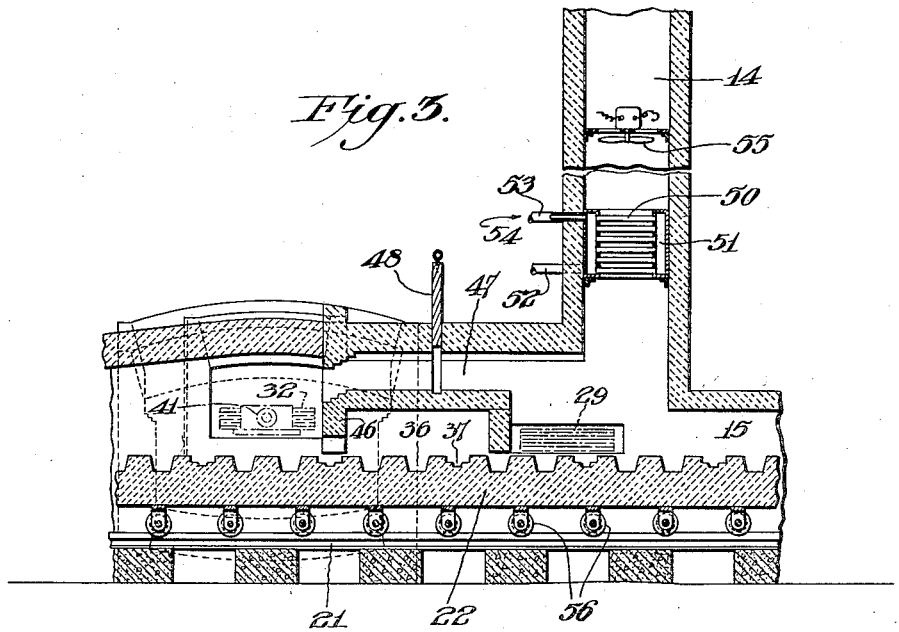
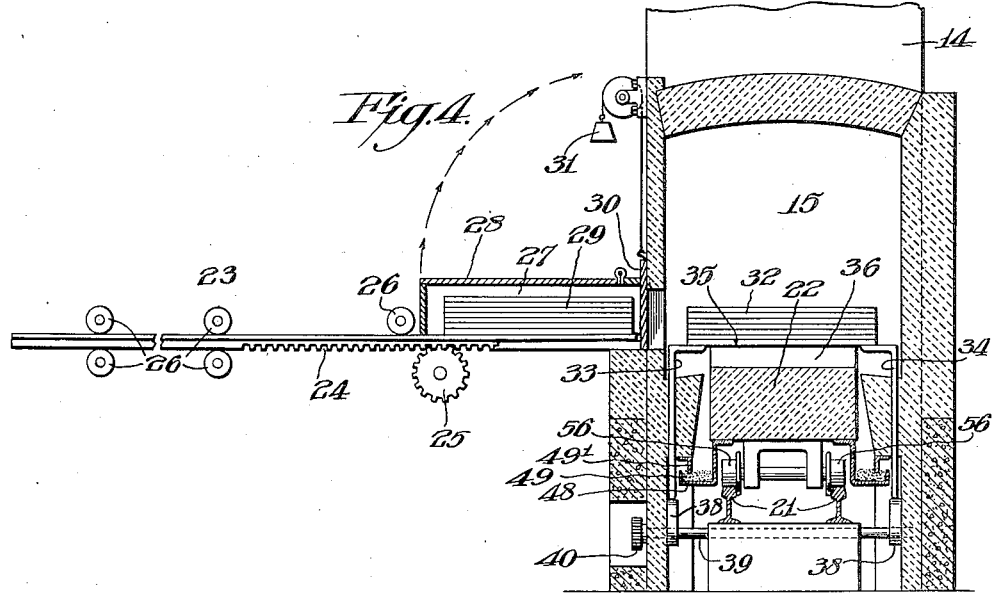

Patented June 20, 1933

1,914,716

UNITED STATES PATENT OFFICE

RUSSELL P. HEUER, OF HAVERFORD, PENNSYLVANIA, ASSIGNOR TO THE AMERICAN METAL COMPANY, LIMITED, OF NEW YORK, N. Y., A CORPORATION OF NEW YORK

COPPER MELTING FURNACE

Application filed April 23, 1930. Serial No. 446,504.

My invention relates to continuous copper melting furnaces.

One purpose of my invention is to eliminate the blowing and poling of molten copper.

A further purpose of my invention is to reduce the size and increase the efficiency of continuous copper melting furnaces.

A further purpose is to make it easier to control continuous copper melting furnaces and to increase the accuracy of their control.

A further purpose is to provide effective preheating space between a reverberatory furnace and its stack.

A further purpose is to provide a conveyor for copper to be preheated and to locate the conveyor within a preferably horizontal path of preheating movement of the furnace products of combustion.

A further purpose is to protect the supporting parts of a conveyor from the heat of a flue within which the top of the conveyor operates.

A further purpose is to control the rate of preheating within a preheater attached to a melting furnace, variantly using heat from the hot products of combustion from the melting furnace to preheat combustion air for the melting furnace, so as to alter the capacity of the melting furnace to melt the charges, and in correspondingly varying the rate of feed of the charges through the preheated paths.

A further purpose is to use a melting furnace with a preheater and to control operation of the furnace by the operation of the preheater and vice versa.

A further purpose is to automatically increase the heating of a melting furnace when the preheater is receiving an excess amount of heat so as to handle the charges in the furnace at a more rapid rate and thus equalize the preheating and melting furnace operations.

A further purpose in conjunction with a melting furnace is controllably to preheat combustion air for the furnace burner and metallic charges to be melted, so that with increase of heating of the charges additional preheating of the air to a burner may be made to increase the intensity of furnace heating and thus melt the charges at greater speed.

A further purpose in the embodiment shown is to provide a bypass for the preheating gases from a melting furnace and to utilize the temperature of the gases in the bypass as a means for equalizing the relative melting in the furnace and heating in the preheater.

Further purposes will appear in the specification and in the claims.

My invention relates to the methods involved and also to apparatus by which these methods may be carried out.

My invention is applied to furnaces for preliminarily heating copper by the hot products of combustion from a reverberatory furnace used for melting copper and in which the operation of the furnace is intended to be continuous.

One illustration of the general character of furnace to which the invention is applied is shown in a patent to Lukens and Heuer, No. 1,733,419 of October 29, 1929 in which the copper charges are shoved down a sloping flue and are dropped from the lower end of the flue into the molten metal pool and in which the hot products of combustion pass upwardly through the same flue to the stack, preliminarily heating the copper charges before they are plunged into the molten metal pool.

My present invention is intended to provide better handling facilities for the charges and a better flue within which to effect the preheating, securing increased efficiency of operation and accuracy of control.

I have preferred to illustrate one form only among the various forms in which my invention may appear, selecting a form which is practical, efficient and reliable and which at the same time well illustrates the principles of my invention.

Figure 2 is a section upon line 2—2 of Figure 1.

Figure 3 is an enlarged, fragmentary, vertical section upon line 3—3 of Figure 1.

Figure 4 is a fragmentary section taken upon line 4—4 in Figure 1.

In the drawings similar numerals indicate like parts.

Figure 1:
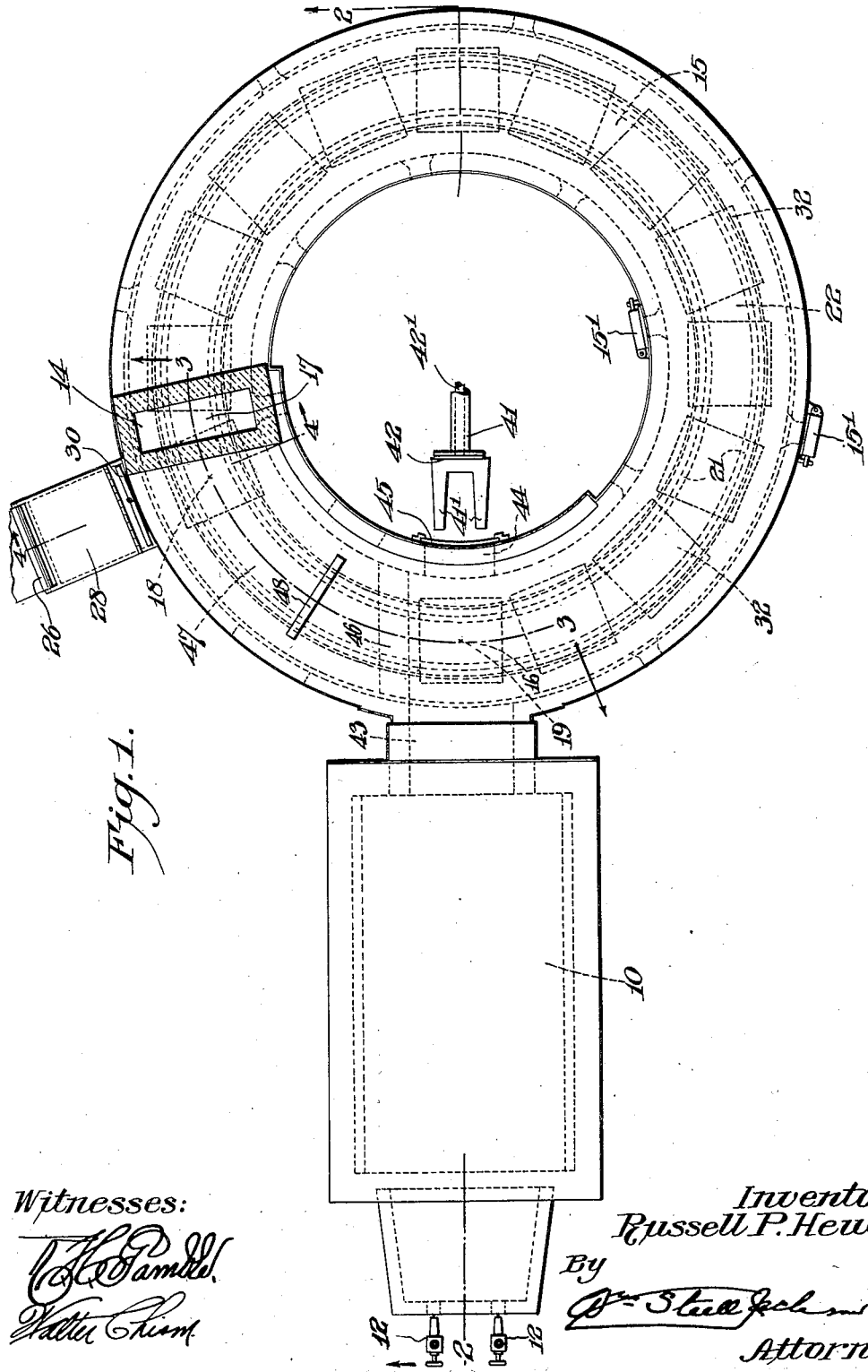
Figure 1 is a horizontal section taken upon the line 1—1 of a furnace embodying my invention and seen in Figure 2.

The furnace 10 is intended to be a conventional reverberatory furnace heated by any suitable means such as by the flame 11 from a liquid or gaseous fuel or powdered coal burner 12 whose hot products of combustion pass above the molten copper pool 13 and are ultimately discharged from the stack 14. Between the furnace and the stack these products pass through a flue 15, in a direction which is selected as counterclockwise in Figure 1, from the point of flue entry 16 to the point of stack discharge 17. The direction is, of course, immaterial.

The flue 15 need not have any slope and, as shown in the drawings, is horizontal so as to receive charges at some point 18 and to heat them while they are being carried in a direction counter to that of the flue gases from the point 18 to a point of discharge 19.

I am careful not to melt the charges within the flue, and I plunge them beneath the molten surface of the bath while this molten surface is protected by a coating 20 of slag.

The flue 15 is desirably circularly annular in horizontal section, but whatever its shape, a support and guide, such as the track 21, is provided upon which a hearth 22 (continuous or discontinuous) is progressed so that the hearth may load at 18 and discharge at 19 in continuous progression about the track.

Though the detail of the structure is immaterial to the broader aspects of my invention, under the requirements of the statute I have given, and will give, considerable detail in explanation of the best embodiment of my invention shown in the figures.

At the loading point 18 I show in Figure 4 a plunger conveyor 23 having a rack 24 driven by a gear 25 and having roller supports above and below the plunger at 26. The conveyor operates within a loading chamber 27 protected against gas discharge by a movable cover 28 so that when the cover is lifted a charge 29 may be placed in the line of movement of the conveyor.

In normal copper metallurgy it is necessary to melt blister copper, which is cast into anodes for electrolytic refining. These are refined into cathodes which are ultimately cast into the marketable forms of copper. Without requiring this, it will be assumed that the charges comprise these cathodes.

The space within the loading chamber is normally protected from the gases of the furnace by a sliding door 30 counterweighted at 31. This door is kept closed during the initial loading operation. When the charges have been placed within the chamber 27 and the door 30 has been opened, the plunger is operated to move the charger into the flue to a position corresponding closely with that of the pile of charges 32. These charges are then lifted above the end of the conveyor by elevator arms 33, 34, the conveyor plunger is withdrawn and the charges are lowered upon surface 35 of the hearth, after which the elevator arms are still further lowered to clear the charges from them and permit movement of the charges along with movement of the hearth.

The upper surface of the conveyor is provided with spaced grooves 36, 37 into which either the charging or discharging plunger may slide.

The elevator arms 33, 34 are lifted and are permitted to lower by cams 38 upon shaft 39 turned by any suitable gearing of which spur gear 40 alone is shown.

The hearth is then moved from its receiving position in Figure 3 to the position for discharge into the pool which is shown in Figure 2. In this latter position the charges are in line with any suitable discharge mechanism, here shown as a machine-operated fork 41.

Mechanism by which a fork is supported and operated is well known in the art. One well known form is partially illustrated and it not further illustrated here for the reason only that such illustration is unnecessary in view both of the fact that such mechanism is so well known and of the further fact that the functions can be performed by hand. With a particular mechanism partly here shown the charge is lifted out to clear the bridge wall. The fork is shifted mechanically from its inactive dotted position at the right of Figure 2 to a point where its charge-supporting end 41' lies within one of the recesses 36 (Figures 3 and 4). The fork is then raised so as to clear the bridge 43 and is projected further forward through the dotted position at the left of Figure 2 to a position over the pool, at which the plunger 42 is advanced by means of the rod 42' to discharge the cathode into the pool. Because they fall from a height they plunge beneath the slag surface of the pool.

The opening 44 for passage of the fork is protected against intrusion of the products of combustion by a door 45 which is opened for each discharge of a pile of charges.

One advantage of making the flue horizontal is that the track may be made continuous about the flue, permitting movement of the hearth in the same direction to successive positions of loading and discharging, with the disadvantage, however, that it becomes then highly desirable to reduce the short-circuiting of hot products of combustion from the furnace to the flue in a direction which in Figure 1 would be clockwise. This can be effected sufficiently for the purpose by the use of a partition 46 which permits the hearth to pass through but closes the greater part of the flue space.

For a purpose hereinafter explained the partition 46 does not in itself wholly cut off the short-circuiting flow of gases to the flue. A passage 47 is provided by which partial gas flow may be permitted; the extent of this flow can be controlled or the flow can be stopped entirely by the use of the valve or damper 48.

Because the partition 46 is located at a point where the hearth or carrier is empty, it can be confined closely to the level of the empty hearth, leaving but very small space for possible leakage of products of combustion, which are cut off at the bottom by the sand seal.

The hearth is protected against leakage of flue gases downwardly by a sand seal 49 carried by the hearth in any suitable way, as by a bracket 48, and within which a fixed sealing edge 49' engages.

Doors 15' are placed in the refractory walls of the flue 15 to make the interior accessible for repair.

Under normal operation of the furnace it is contemplated that hot products of combustion shall all or substantially all pass through the horizontal flue 15 to the stack, and shall all or substantially all be used for preheating the charges. However, because of variation in the amount of heat required for the furnace, dependent largely upon the rate at which charges are delivered to it, and in the number and speed of preheating of the charges which may be required, I have provided the by-pass 47 for part of the hot products of combustion in order that some of them may be short-circuited to the chimney without passing about the horizontal conduit 15.

Within the stack I place a preheater 50 for preheating the inlet air 54 supplied to the furnace, and connect one header 51 with the burner 12 through a pipe 52 having inlet 53.

The heat for melting the charges is applied within the preheater and in the reverberatory furnace. It is desirable that in the division of the heat applied in these two places the preheater shall bring the charges up as nearly to melting as possible without danger of any melting in the preheater.

For the purpose of securing this result the relative amount of heating which takes place in the preheater and in the reverberatory furnace must be controlled closely. The heating which takes place in the reverberatory furnace is done at high temperatures and is relatively expensive. The heating which takes place in the preheater is done at lower temperatures and is obtained from waste heat. There may be a tendency for excess heating to take place in the preheater which would cause the charges to melt on the preheater hearth and stop the travel of the hearth. To prevent this some of the excess gases from the reverberatory furnace may be bypassed directly to the exit stack where they are effective in preheating the air which supports combustion in the reverberatory furnace.

The increase in the temperature of the combustion air increases the rate of heating which takes place in the reverberatory furnace to an extent out of proportion to the extent of air heating; and this increased heat in the reverberatory furnace will permit a corresponding increase in rate or speed at which the charges are fed through the preheater, which will still further eliminate the tendency for melting to take place in the preheater and at the same time will speed up the operation of the furnace.

In order to control the total amount of withdrawal of products of combustion from the reverberatory furnace chamber and thus to avoid an excessive reduction of temperature in it by too much short-circuiting of the products of combustion, I show a purely conventional fan 55 within the stack by which the speed of gases in the stack can be controlled.

Partial short-circuiting of hot products of combustion may be continuous if required. This not only helps to control the temperature in the preheating part of the flue so that the preheating is not excessive, but provides for increase of the temperature in the reverberatory furnace chamber when needed by supplying additional heat in the chimney to preheat the air for the burner.

All of my illustrations are intended to be largely diagrammatic, as any form of preheater which will perform the function is suitable for this purpose, just as, for example, any form of conveyor, loading, and unloading mechanism which will perform the respective function may be used to carry out the broader form of my invention.

My treatment of the hearth as continuous and circular does not, of course, preclude the use of individual cars, although these would be less desirable in practice, nor require that the path described by the cars shall be circular.

Whatever the character of support for the charges while travelling within the horizontal flue and whatever guides be used, wheels 56 may be used to engage the guides.

Continuity or substantial continuity of the conveyor results in a substantially continuous layer of piles of charges about the entire circular flue, giving a long path for heating of the charges in the individual piles. For the reason that operation of the conveyor may be controlled by any operating system for causing carriers or cars to move about it, the length of time the charges are subjected to the heat of the flue is wholly within the control of the operator, who may maintain them within the flue a longer time to heat them to a point more nearly approaching their melting point, where the demand for copper from the pool is moderate, but who may pass them through with less time for heating where the desire for additional speed of melting justifies plunging them into the pool in a less highly heated condition.

By this invention I secure the same benefits of greatly reducing the need for blowing the bath to take out sulphur as in the Lukens and Heuer Patent No. 1,733,419, by removing sulphur in the preheating operation and by reducing the amount of sulphur which the metal absorbs from the combustion gases during the melting. I thus also, as in the case of the patent above, avoid the subsequent necessity for removing the oxide produced in the blowing.

Metal or slag will be drawn off through the tap opening 57, desirably consisting of a refractory gate so that the tapping level may be conveniently regulated.

The slag upon the surface of the pool is normally that which forms automatically due to oxidizing some of the metal with some deposition of ash from the fuel of combustion.

It will be seen that the separate plunging delivery of piles of cathodes dropped into the pool prevents thermal conductivity from the pool back into the other charges or back into the conveyor system.

It will be noted that controllable additional heating of the burner air supply by the hot products of combustion, affords a means by which this air preheating may be made to balance or equalize the rate of melting of the charges against the rate of preheating within the preheating part of the flue without reference to how the air preheating is accomplished.

This air heating control may be explained as follows:

When the charge-preheating gases in the flue become relatively too hot, or—which may be merely another way of stating the matter—when the rate of progress of the charges through the preheater becomes reduced to a sufficient extent so that the charges become excessively preheated under the operating conditions of the furnace at that time, with consequent danger of melting, or actual melting of the charges in the preheater, it is quite desirable to increase the speed of melting in the melting furnace.

This can be done by utilizing some of the heat available from the preheater to preheat, for example, the combustion air and thereby increase the temperature in the melting furnace. Conditions will then be relieved from two standpoints, by reducing the amount of heat in the preheater, and by increasing the rate at which the melting furnace is capable of handling the preheated charges so that these charges can be passed more rapidly through the preheater and may thus be subjected to the preheating temperature for a shorter time. One way of heating the combustion air inlet is through bypassing a portion of the gas leaving the melting furnace and using it at some portion of its by-passed path to preheat the combustion air. A very slight increase of temperature of the combustion air well justifies the use of part of the products of combustion for heating this air.

The question of particular location of the air pipes to be heated within the path of these bypassed products of combustion is a matter of preference and design and my location of these air pipes to be preheated within the stack is not therefore to be considered as even suggesting that this is the only place where they can be placed.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a copper melting furnace equipment, a reverberatory copper furnace and a continuous travelling hearth therefor having an extended horizontal path wholly within the path of travel of the hot products of combustion.

2. In a copper melting furnace equipment, a reverberatory furnace, a stack therefor, a horizontal flue connecting the reverberatory furnace with the stack, a movable hearth traversing the horizontal part of the flue adapted to carry charges of copper from an intake to a delivery point to the furnace through the flue in a direction opposite to the direction of passage of the flue gases, means for loading the hearth and means for transferring charges from the hearth to the reverberatory funace.

3. In a copper melting furnace equipment, a reverberatory furnace, a stack therefor, a horizontal flue connecting the furnace and stack and having a curved path, a continuous conveyor movable about said path and at all times subjected to the heat of the furnace products of combustion, means for loading the conveyor at one point in its path and means for unloading the conveyor and delivering the charge from the conveyor into the furnace pool at another point in its travel.

4. In a copper melting furnace equipment, a reverberatory copper furnace, a substantially horizontal annular conveyor therefor, a loader for the conveyor, flue walls providing a path of travel of the products of combustion about and in a direction opposite to the path of the charges upon the conveyor and unloading means for discharging solid charges from the conveyor generally radial to the conveyor path and adapted to transfer the charges to the furnace pool to be melted.

5. In a copper melting furnace equipment, a reverberatory copper furnace, a horizontal flue for the products of combustion, a continuous movable hearth in said flue, loading mechanism for the hearth and unloading mechanism therefrom.

6. In a copper melting furnace equipment, a reverberatory copper furnace, an annular flue carrying the hot gases of combustion from the furnace, a stack connected therewith, a conveyor travelling a path within the flue, loading mechanism operative from outside the annulus for placing copper charges on the conveyor, means for moving the conveyor to bring the loaded charges to a point of discharge and unloading mechanism operative from inside the annulus.

7. In a copper melting furnace equipment, a reverberatory furnace, a stack, walls forming a substantially horizontal flue between the furnace and the stack, a controlled short-circuit for the hot products of combustion to vary the proportion of these products passing through the flue and conveyor means moving in a direction opposite to the movement of the gases for moving the copper charges from a loading position of the conveyor to a discharge position in proximity to the furnace.

8. In a copper melting furnace equipment, a reverberatory furnace, a stack therefor, walls forming a horizontal flue connected with the stack, a conveyor having a closed path and supports therefor whereby the conveyor is movable in the flue, means for loading copper on the top of the conveyor, a partition cutting off flue gases from effective travel in one direction from the furnace to the loading position, and means for unloading the copper from the conveyor before it reaches the partition.

9. In a copper melting furnace equipment, a reverberatory furnace, a stack therefor, walls forming a horizontal flue connected with the stack, a conveyor having a closed path and supports therefor whereby the conveyor is movable in the flue, means for loading copper on the top of the conveyor, a partition cutting off flue gases from effective travel in one direction from the furnace to the loading position, a controlled bypass for passing gases through the partition and means for unloading the copper from the conveyor before it reaches the partition.

10. In a copper melting furnace equipment, a reverberatory furnace, a stack therefore, a flue between the furnace and the stack, a conveyor having a closed path within the flue substantially shielding from the products of combustion the space in the flue beneath the conveyor, wheel and track support for the conveyor whereby the conveyor is carried and guided about the flue, a partition in the upper part of the flue substantially closing off flow of hot products of combustion through the flue to the stack in the direction of movement of the conveyor, charge-loading mechanism on one side of said partition and charge-unloading mechanism on the other side of said partition.

11. In a copper melting furnace equipment, a reverberatory furnace, a stack therefor, an annular flue connecting the furnace and stack, a conveyor traversing said annulus, means for inserting charges within the flue above said conveyor, means for lifting the charges while the inserting means is withdrawn and depositing the charges upon the conveyor and means for removing the charges from the conveyor and delivering them into the furnace.

RUSSELL P. HEUER.